United States Patent
Sakurai et al.

(10) Patent No.: US 8,708,286 B2
(45) Date of Patent: Apr. 29, 2014

(54) SWING TIP ASSEMBLY ROTATION JOINT

(75) Inventors: Seiya Sakurai, Seattle, WA (US); Kelly T. Jones, Snohomish, WA (US); Stephen J. Fox, Everett, WA (US); Bruce R. Fox, Everett, WA (US); Nicholas I. Bennett, Seattle, WA (US); Mark S. Good, Seattle, WA (US)

(73) Assignee: The Boeing Company, Chicago, IL (US)

( * ) Notice: Subject to any disclaimer, the term of this patent is extended or adjusted under 35 U.S.C. 154(b) by 117 days.

(21) Appl. No.: 13/530,089

(22) Filed: Jun. 21, 2012

(65) Prior Publication Data

US 2013/0341467 A1    Dec. 26, 2013

(51) Int. Cl.
*B64C 9/00*    (2006.01)

(52) U.S. Cl.
USPC .............................. 244/201; 403/96; 403/92

(58) Field of Classification Search
USPC ............... 244/201, 203, 199.1–199.4, 46–49, 244/45 R, 45 A; 403/91–98
See application file for complete search history.

(56) References Cited

U.S. PATENT DOCUMENTS

| | | | | |
|---|---|---|---|---|
| 2,418,301 A * | 4/1947 | Heal | | 244/91 |
| 2,428,934 A | 10/1947 | Bourquin et al. | | |
| 2,745,613 A * | 5/1956 | Oswald et al. | | 244/76 R |
| 2,846,165 A * | 8/1958 | Axelson | | 244/90 R |
| 4,415,132 A | 11/1983 | Shirk | | |
| 4,671,473 A * | 6/1987 | Goodson | | 244/199.4 |
| 4,998,689 A * | 3/1991 | Woodcock | | 244/46 |
| 5,899,410 A | 5/1999 | Garret | | |
| 6,042,059 A * | 3/2000 | Bilanin et al. | | 244/199.1 |
| 6,089,502 A * | 7/2000 | Herrick et al. | | 244/35 R |
| 6,345,790 B1 | 2/2002 | Brix | | |
| 6,467,732 B2 * | 10/2002 | Tsukahara et al. | | 244/199.4 |
| 6,533,489 B1 * | 3/2003 | Zheng | | 403/95 |
| D488,765 S * | 4/2004 | Boren | | D12/345 |
| 7,275,722 B2 | 10/2007 | Irving et al. | | |
| 7,478,972 B2 * | 1/2009 | Takamori et al. | | 403/409.1 |
| 8,083,185 B2 | 12/2011 | Konings et al. | | |
| 2005/0133672 A1 * | 6/2005 | Irving et al. | | 244/201 |
| 2005/0276657 A1 * | 12/2005 | Yumikino | | 403/92 |
| 2008/0191099 A1 * | 8/2008 | Werthmann et al. | | 244/199.4 |
| 2013/0009016 A1 * | 1/2013 | Fox et al. | | 244/204.1 |
| 2013/0099060 A1 * | 4/2013 | Dees et al. | | 244/199.4 |
| 2013/0206917 A1 * | 8/2013 | Sakurai et al. | | 244/214 |

* cited by examiner

*Primary Examiner* — Christopher P Ellis
*Assistant Examiner* — Medhat Badawi
(74) *Attorney, Agent, or Firm* — Ameh IP; Elahe Toosi; Lowell Campbell

(57) ABSTRACT

A rotation joint and methods for rotationally coupling a swing tip assembly to a fluid-dynamic body are presented. A rotation plate configured to couple to the swing tip assembly comprises a slide ring comprising an open center, an upper slide surface, an inner slide surface, and a lower slide surface. An upper joint plate is slidably coupled to the upper slide surface and the inner slide surface is configured to couple the fluid-dynamic body. A lower joint plate is slidably coupled to the lower slide surface and the inner slide surface, and is coupled to the upper joint plate through the open center. The lower joint plate is configured to couple to the fluid-dynamic body.

20 Claims, 18 Drawing Sheets

SECTION A-A 708

SWING TIP ASSEMBLY ROTATION JOINT

FIELD

Embodiments of the present disclosure relate generally to fluid-dynamic design. More particularly, embodiments of the present disclosure relate to design of variable-sweep fluid-dynamic bodies.

BACKGROUND

Wing span limitations of commercial aircraft may be driven by airport gate and taxiway size restrictions. Lengthened wing spans may be used to increase performance of aircraft such as lift-to-drag related efficiency performance. Increasing aircraft wing span to increase aircraft performance may conflict with airport gate and taxiway size restrictions. For example, airport gate and taxiways built for one generation of aircraft may be too small for later generations of aircraft built with longer wing spans. The airport restrictions may prevent aircraft having larger wing spans for flying more efficiently from being utilized at airports with such airport restrictions.

SUMMARY

A rotation joint and methods for rotationally coupling a swing tip assembly to a fluid-dynamic body are presented. A rotation plate that can be coupled to the swing tip assembly comprises a slide ring comprising an open center, an upper slide surface, an inner slide surface, and a lower slide surface. An upper joint plate is slidably coupled to the upper slide surface and the inner slide surface and can be coupled the fluid-dynamic body. A lower joint plate is slidably coupled to the lower slide surface and the inner slide surface, and is coupled to the upper joint plate through the open center. The lower joint plate can also be coupled to the fluid-dynamic body.

The rotation joint allows a wing tip to rotate aft in order to facilitate a reduced wing span, e.g., during taxi and gate parking, and other applications. The rotation joint comprises a "donut" inner ring attached to the wing tip, clamped in place by upper and lower plates attached to a wing box structure. In addition, the wing tip can be rotated forward for high speed aerodynamic benefit, rotated part way aft for low speed aerodynamic benefit, and rotated further aft for taxi and gate parking.

In this manner, embodiments of the disclosure provide an ability to change a wing span of an aircraft. Thereby, the aircraft may be more efficient in flight with a larger wing span yet still be accommodated within existing airport restrictions.

In an embodiment, a rotation joint for rotationally coupling a swing tip assembly to a fluid-dynamic body comprises a rotation plate, an upper joint plate, and a lower joint plate. The rotation plate couples to a swing tip assembly, and comprises a slide ring comprising an open center, an upper slide surface, an inner slide surface, and a lower slide surface. The upper joint plate is slidably coupled to the upper slide surface and the inner slide surface, and is configured to couple to a fluid-dynamic body. The lower joint plate is slidably coupled to the lower slide surface and the inner slide surface, and is configured to couple to the upper joint plate through the open center, and is configured to couple to the fluid-dynamic body.

In another embodiment, a method for providing rotation of a swing tip assembly coupled to a fluid-dynamic body provides a rotation plate configured to couple to the swing tip assembly. The rotation plate comprises a slide ring comprising an open center, an upper slide surface, an inner slide surface, and a lower slide surface. The method further slidably couples an upper joint plate to the upper slide surface and the inner slide surface, the upper joint plate is operable to couple to a fluid-dynamic body. The method further slidably couples a lower joint plate to the lower slide surface and the inner slide surface, the lower joint plate is operable to couple to the fluid-dynamic body. The method further couples the lower joint plate to the upper joint plate through the open center.

In a further embodiment, a method for operating a rotation joint for a swing tip assembly coupled to a fluid-dynamic body slides an upper slide surface of a slide ring of a rotation plate on an upper slidable coupling to an upper joint plate coupled to the fluid-dynamic body. The method further, slides a lower slide surface of the slide ring on a lower slidable coupling to a lower joint plate coupled to the fluid-dynamic body. The method further, slides an inner slide surface of the slide ring on the upper slidable coupling to the upper joint plate and on the lower slidable coupling to the lower joint plate, the lower joint plate is coupled to the upper joint plate through an open center of the slide ring. The method, then configures a position of the swing tip assembly in a plane of the fluid-dynamic body by rotation of the rotation plate relative to the upper joint plate and the lower joint plate, the rotation plate is coupled to the swing tip assembly.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, actuators, vehicle structures, fluid dynamics, flight control systems, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, a rotation joint for an aircraft wing tip. Embodiments of the disclosure, however, are not limited to such aircraft wing tip applications, and the techniques described herein may also be utilized in other applications. For example but without limitation, embodiments may be applicable to a rotation joint for swing assemblies of hydrofoils, wind turbines, tidal power turbines, or other fluid-dynamic surface.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
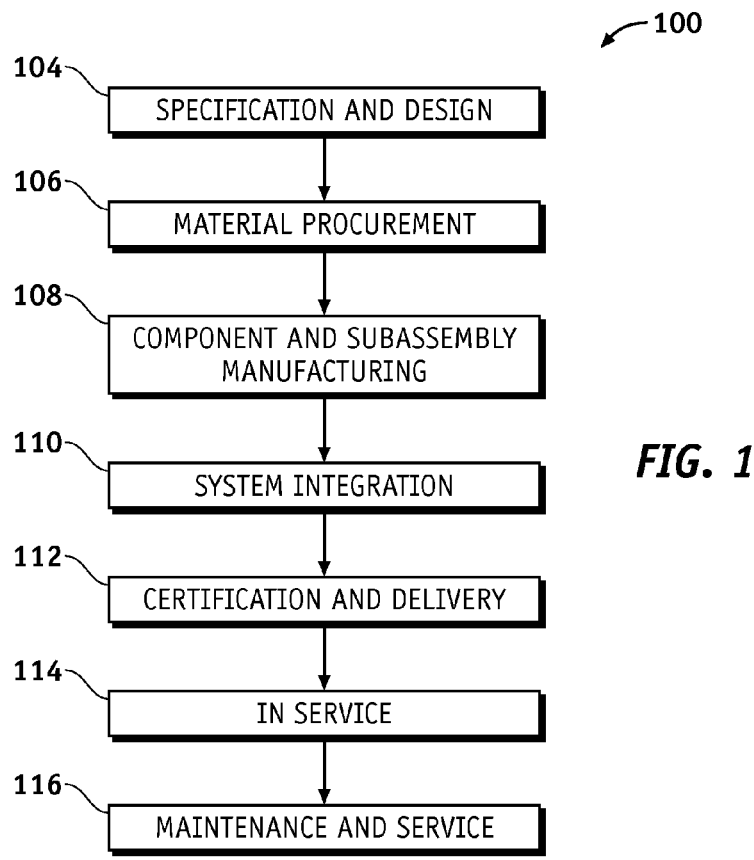
FIG. 1 is an illustration of a flow diagram of an exemplary aircraft production and service methodology.
Figure 2:
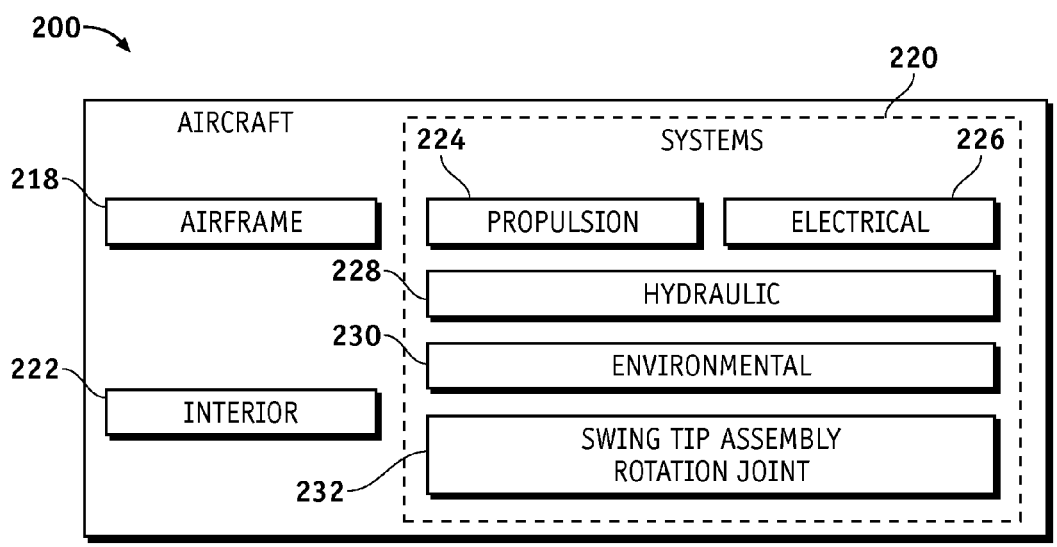
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 1, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a swing tip assembly rotation joint 232. Any number of other systems may also be included. Although an aerospace example is shown, the embodiments of the disclosure may be applied to other industries.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
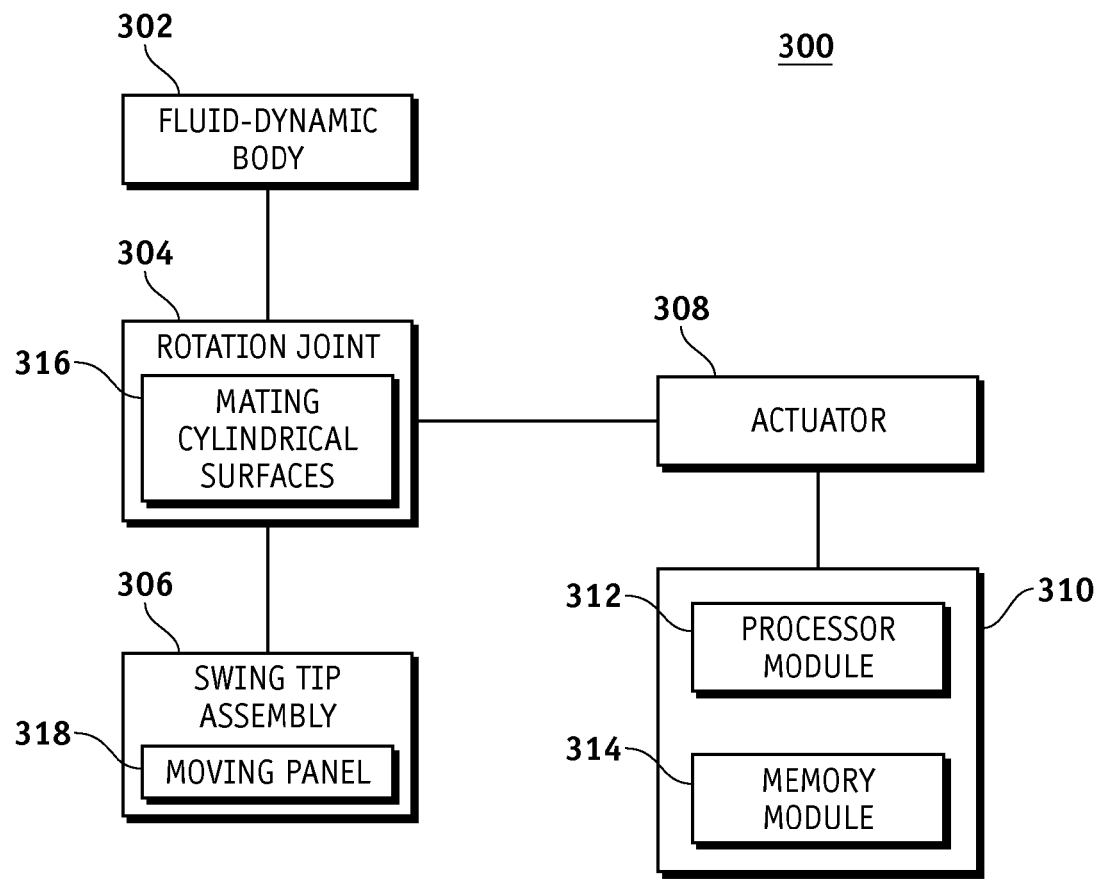
FIG. 3 is an illustration of an exemplary block diagram of a swing tip assembly system according to an embodiment of the disclosure.

FIG. 3 is an illustration of an exemplary block diagram of a swing tip assembly system 300 (system 300) according to an embodiment of the disclosure. The system 300 may comprise a fluid-dynamic body 302, a rotation joint 304, a swing tip assembly 306, an actuator 308 (swing tip actuator 308), and a controller 310.

The fluid-dynamic body 302 may be coupled to the rotation joint 304, and may comprise a lifting surface and/or a control surface. The lifting surface may comprise, for example but without limitation, a wing, a canard, a horizontal stabilizer, or other lifting surface. The control surface may comprise, for example but without limitation, a slat, an elevator, a flap, a spoiler, an elevon, or other control surface. As mentioned above, embodiments may be applicable to hydrofoils, wind turbines, tidal power turbines, or other fluid-dynamic surface. Thus, an aerodynamic body and a fluid-dynamic body may be used interchangeably in this document.

The rotation joint 304 is configured to rotationally couple the swing tip assembly 306 to the fluid-dynamic body 302 to rotate the swing tip assembly 306 in a plane 504 (FIG. 5) of the fluid-dynamic body 302. The rotation joint 304 comprises a "pinless" joint that relies on mating cylindrical surfaces 316 for transferring torsional, shear and bending loadings while maintaining a required stiffness. This allows for a lighter weight solution because design limits used for flight are generally sufficient to cover ground loading conditions. Surfaces of the mating cylindrical surfaces 316 are lined using low friction material. The rotation joint 304 is discussed in more detail below in the context of discussion of FIGS. 9-14.

The swing tip assembly 306 is configured to swing or rotate in the plane 504 of the fluid-dynamic body 320 in response to an actuation of the rotation joint 304 by the actuator 308. The swing tip assembly 306 may comprise a tip of the fluid-dynamic body 302. In one embodiment, the swing tip assembly 306 comprises a rotating wing tip 306 of a wing 302 (FIG. 4) of the aircraft 200 (FIG. 2). In other embodiments, the swing tip assembly 306 may comprise, for example but without limitation, a tip of a control surface, a tip of a lifting surface, or other portion of a structure that can swing/rotate in a plane of the structure.

The swing tip assembly 306 may comprise a moving panel 318 located near a stationary part 610 (FIG. 6) of the fluid-dynamic body 302 and configured to move before the swing tip assembly 306 is rotated. The moving panel 318 allows for a space envelope for a remainder of the swing tip assembly 306 to occupy while in a rotated state. The moving panel 318 may comprise, for example but without limitation, a folding panel in a folding configuration 612 (FIG. 6), a sliding panel in a sliding configuration 726 (FIG. 7A), or other movable surface configuration. The moving panel 318 is discussed in more detail in the context of discussion of FIGS. 6 and 7A below.

The actuator 308 is configured to produce a rotating motion in response to an actuation command to actuate the rotation joint 304 for rotating the swing tip assembly 306. The actuator 308 may comprise, for example but without limitation, a linear hydraulic actuator, a ball screw actuator, or other actuator that is capable of actuating the rotation joint 304 for rotating the swing tip assembly 306.

The controller 310 may comprise, for example but without limitation, a processor module 312, a memory module 314, or other module. The controller 310 may be implemented as, for example but without limitation, a part of an aircraft system, a centralized aircraft processor, a subsystem computing module comprising hardware and/or software devoted to the system 300, or other processor.

The controller 310 is configured to control the rotation joint 304 to swing/rotate the swing tip assembly 306 according to various operation conditions. The operation conditions may comprise, for example but without limitation, flight conditions, ground operations, or other condition. The flight conditions may comprise, for example but without limitation, take off, cruise, approach, landing, or other flight condition.

The ground operations may comprise, for example but without limitation, air breaking after landing, taxing, parking, or other ground operation. The controller 310 may be located remotely from the rotation joint 304, or may be coupled to the rotation joint 304.

In operation, the controller 310 may control the rotation joint 304 by sending an actuation command from the actuator 308 to the rotation joint 304, thereby swinging/rotating the swing tip assembly 306 in response to the actuation command as explained in more detail below in the context of discussion of FIGS. 4-5. An actuation mechanism 1700 of the swing tip assembly system 300 that can be controlled by the controller 310 is explained in more detail in the context of discussion of FIG. 17 below.

The processor module 312 comprises processing logic that is configured to carry out the functions, techniques, and processing tasks associated with the operation of the system 300. In particular, the processing logic is configured to support the system 300 described herein. For example, the processor module 312 may direct the rotation joint 304 to swing/rotate the swing tip assembly 306 based on various operation conditions.

The processor module 312 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices comprising hardware and/or software, e.g., a combination of a digital signal processor and a microprocessor, a plurality of microprocessors, one or more microprocessors in conjunction with a digital signal processor core, or any other such configuration.

The memory module 314 may comprise a data storage area with memory formatted to support the operation of the system 300. The memory module 314 is configured to store, maintain, and provide data as needed to support the functionality of the system 300. For example, the memory module 314 may store flight configuration data, rotation positions of the swing tip assembly 306, or other data.

In practical embodiments, the memory module 314 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 314 may be coupled to the processor module 312 and configured to store, for example but without limitation, a database, and the like. Additionally, the memory module 314 may represent a dynamically updating database containing a table for updating the database, or other application. The memory module 314 may also store, a computer program that is executed by the processor module 312, an operating system, an application program, tentative data used in executing a program, or other application.

The memory module 314 may be coupled to the processor module 312 such that the processor module 312 can read information from and write information to the memory module 314. For example, the processor module 312 may access the memory module 314 to access an aircraft speed, a swing position of the swing tip assembly 306, an angle of attack, a Mach number, an altitude, or other data.

As an example, the processor module 312 and memory module 314 may reside in respective application specific integrated circuits (ASICs). The memory module 314 may also be integrated into the processor module 312. In an embodiment, the memory module 314 may comprise a cache memory for storing temporary variables or other intermediate information during execution of instructions to be executed by the processor module 312.

Figure 4:
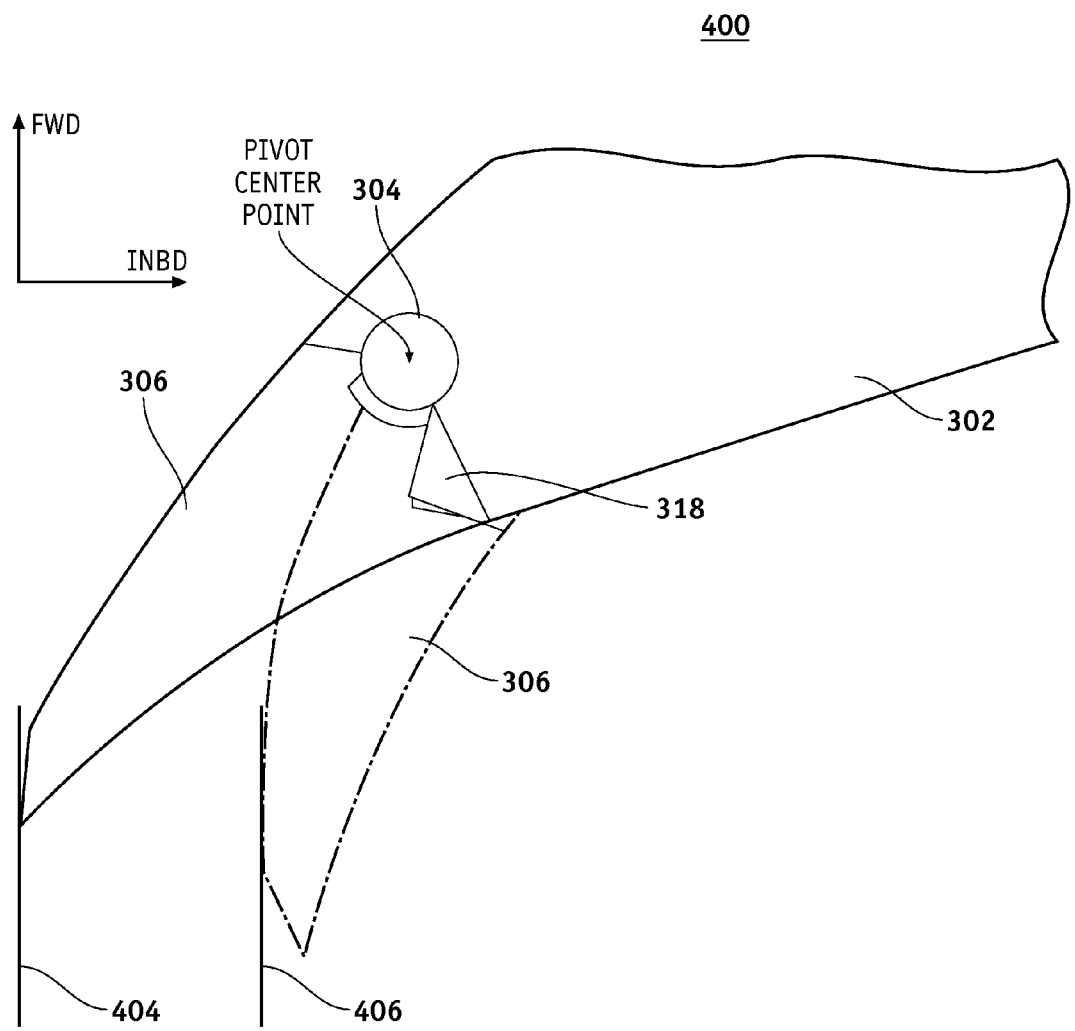
FIG. 4 is an illustration of an exemplary perspective view of a swing tip assembly system showing a rotating wing tip in a high speed extended configuration and in a rotated stowed configuration (ground position) according to an embodiment of the disclosure.

FIG. 4 is an illustration of an exemplary perspective view of a swing tip assembly system 400 (system 400) showing the rotating wing tip 306 in a high speed extended configuration 404 and in a rotated stowed configuration 406 during taxi or gate parking maneuvers according to an embodiment of the disclosure.

The system 400 comprises the wing 302 as an example of the fluid-dynamic body 302, the rotating wing tip 306 as an example of the swing tip assembly 306, and the rotation joint 304. Thus, the wing 302 and the fluid-dynamic body 302 may be used interchangeably in this document. Similarly, the rotating wing tip 306 and the swing tip assembly 306 may be used interchangeably in this document. FIG. 4 may have functions, material, and structures that are similar to the embodiments shown in FIG. 3. Therefore, common features, functions, and elements may not be redundantly described here.

Increasing wing span using the rotation joint 304 ensures constant structural integrity whether the rotating wing tip 306 is in a locked out high speed extended configuration 404 in flight or the rotated stowed configuration 406 during taxi or gate parking maneuvers. The rotating wing tip 306 can also rotate in flight during different modes of flight such as low speed flight.

Figure 5:
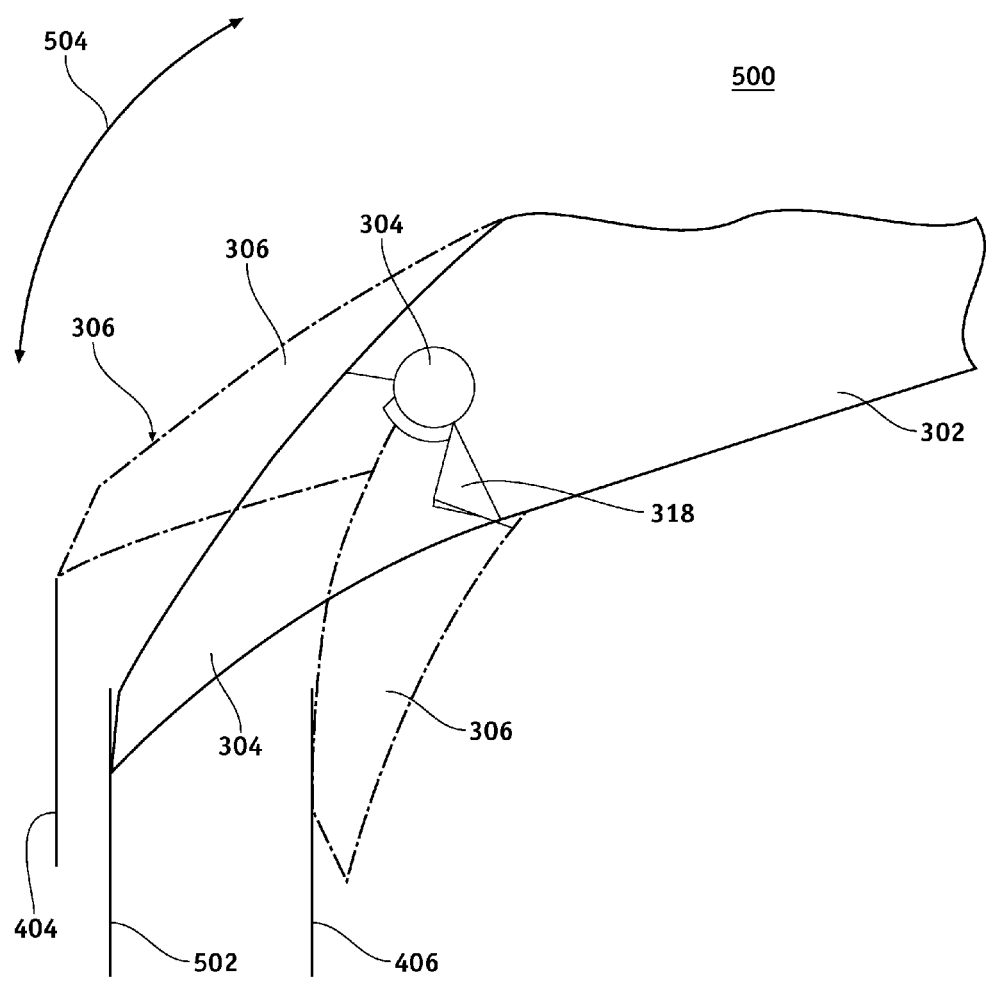
FIG. 5 is an illustration of an exemplary perspective view of a swing tip assembly system showing a rotating wing tip in a high speed extended configuration, in a low speed rotated swept back configuration, and in a rotated stowed configuration according to an embodiment of the disclosure.

FIG. 5 is an illustration of an exemplary perspective view of a swing tip assembly system 500 (system 500) showing the rotating wing tip 306 in the high speed extended configuration 404, in a low speed rotated swept back configuration 502, and in a rotated stowed position 406 during taxi or gate parking maneuvers according to an embodiment of the disclosure.

The rotating wing tip 306 may be deployed by the rotation joint 304 from the aerodynamic body 302 through a plurality of positions. The positions may begin by positioning the rotating wing tip 306 forward at the high speed extended configuration 404 and move through intermediate positions to the deployed position. The deployed position may comprise positioning the rotating wing tip 306 at, for example but without limitation, the low speed rotated swept back configuration 502, the rotated stowed position 406 during taxing and gate parking maneuvers, or other deployed position.

The rotating wing tip 306 may be maintained in line with the wing 302 in the high speed extended configuration 404 without rotation during a high speed flight condition. The rotating wing tip 306 may also rotate forward to provide a high speed fluid-dynamic efficiency.

The rotating wing tip 306 rotates partially aft in the low speed rotated swept back configuration 502 to provide a low speed fluid-dynamic efficiency. The rotating wing tip 306 rotates aft in full rotation in the rotated stowed position 406 when the aircraft is on ground.

Figure 6:
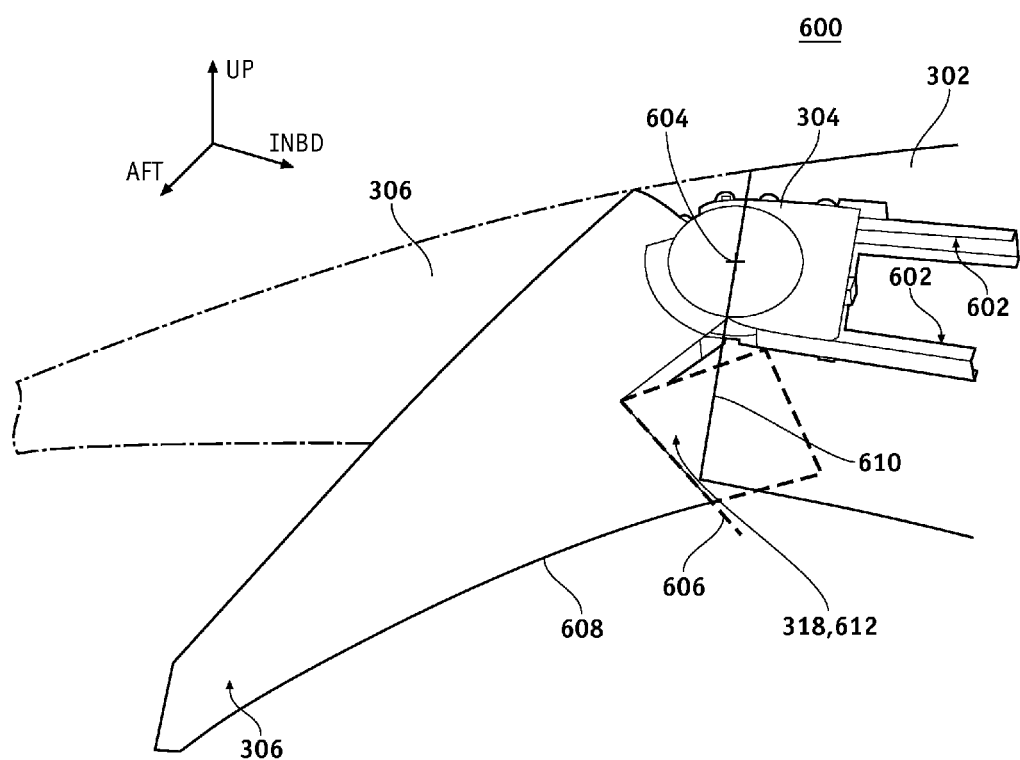
FIG. 6 is an illustration of an exemplary perspective view of a swing tip assembly system showing a rotation joint and a moving panel of a rotating wing in a folding configuration according to an embodiment of the disclosure.

FIG. 6 is an illustration of an exemplary perspective view of a swing tip assembly system 600 showing the rotation joint 304 and the moving panel 318 of the rotating wing tip 306 in a folding configuration 612 according to an embodiment of the disclosure. The rotation joint 304 is coupled to a wing spar 602 of the wing 302 and to the rotating wing tip 306. In the embodiment shown in FIG. 6, the moving panel 318 is located near a stationary part 610 (fixed part 610) of the wing 302 and is configured to fold before the rotating wing tip 306 is rotated. The moving panel 318 folds or rotates around a hinge ling 606 and drops below a trailing edge 608 of the rotating wing tip 306 before the rotating wing tip 306 is rotated.

Figure 7:
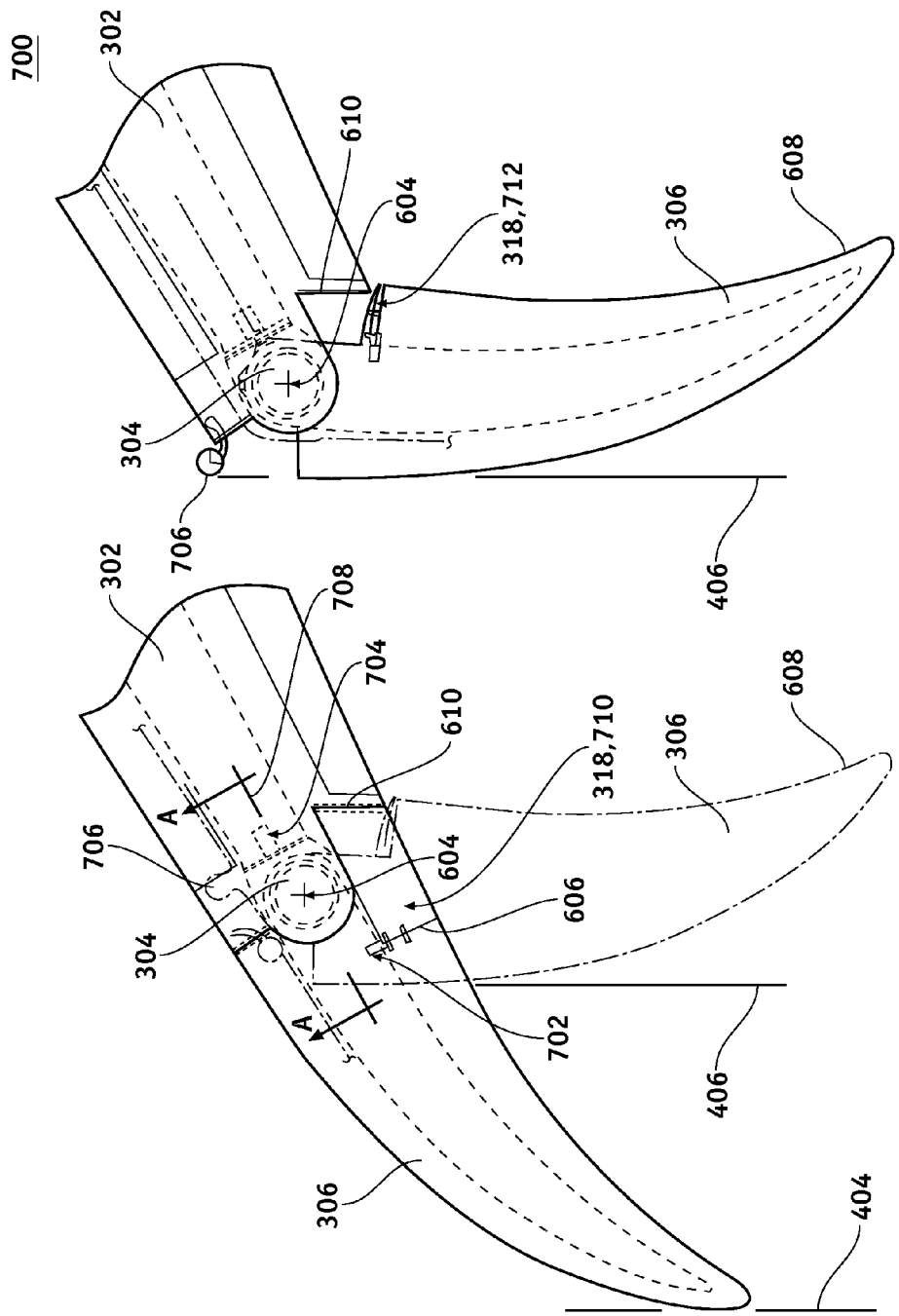
FIG. 7 is an illustration of a swing tip assembly system showing more detail of the swing tip assembly system of the FIG. 6.

FIG. 7 is an illustration of a swing tip assembly system 700 (system 700) showing more detail of the system 600 of FIG. 6. The system 700 may comprise the wing 302, the rotation joint 304, and the rotating wing tip 306. The rotation joint 304 is configured to rotate the rotating wing tip 306 around the pivot center 604 from the high speed extended configuration 404, to a rotated stowed position 406 during taxi and gate operation in response an actuation command from the actuator 308.

When the rotating wing tip 306 is not rotated, the moving panel 318 is in an up position 710.

Before the rotating wing tip 306 is rotated, the moving panel 318 folds down in a folded down position 712, and drops below the trailing edge 608 in response to a panel moving actuator 702. The panel moving actuator 702 may comprise, for example but without limitation, a linear hydraulic actuator, a ball screw actuator, an electric actuator, or other actuation mechanism.

Figure 9:
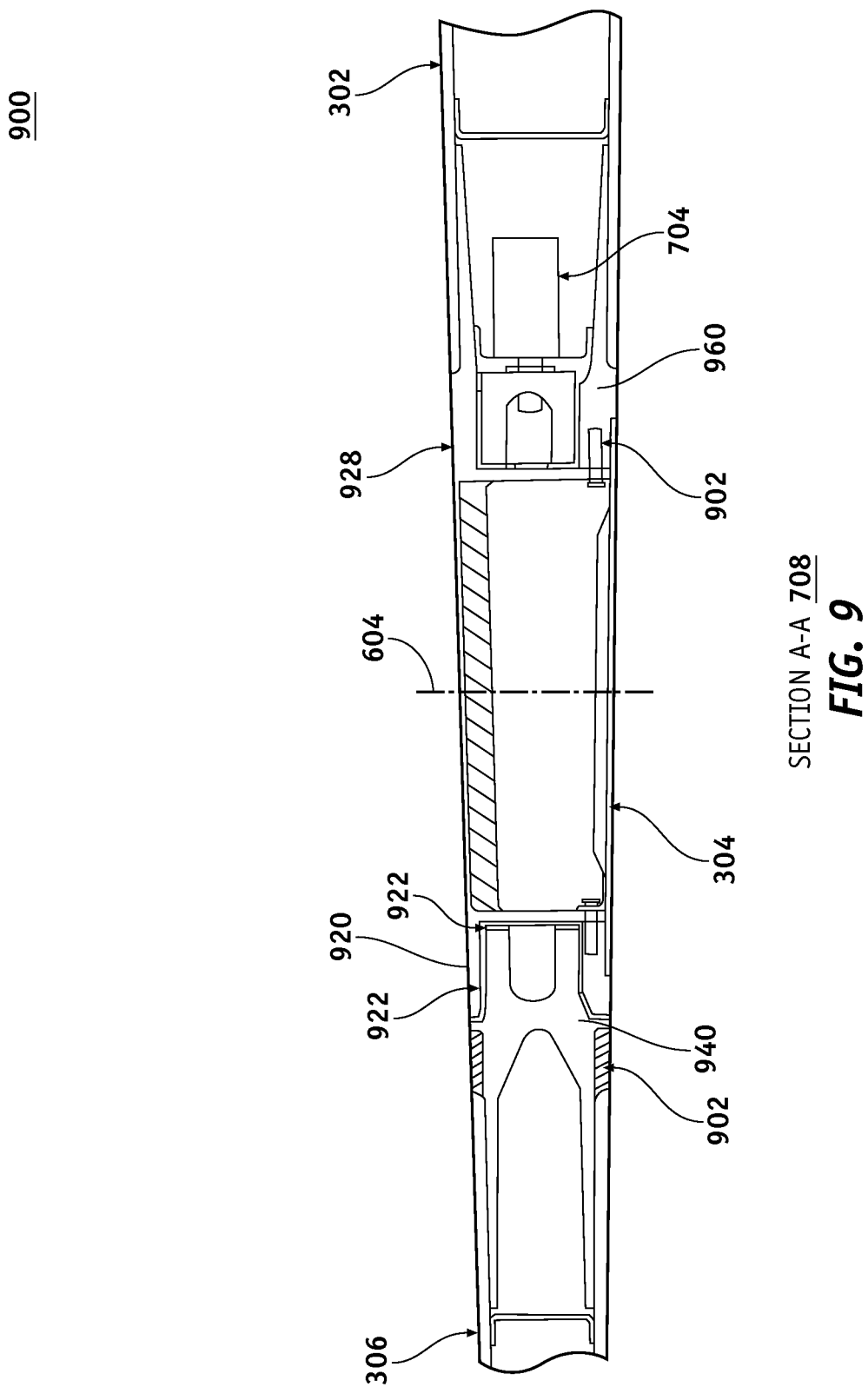
FIG. 9 is an illustration of a cross sectional view of the swing tip assembly system of FIG. 6 taken along a line A-A.

In a rotated position such as the low speed rotated swept back configuration 502 and the rotated stowed position 406, a lock mechanism 704 may be coupled to the mating cylindrical surfaces 316 of the rotation joint 304 to secure the rotating wing tip 306. In this manner, the lock mechanism 704 locks a position of the rotating wing tip 306 by locking a rotation position of a rotation plate 940 relative to an upper joint plate 920 and a lower joint plate 960 (FIG. 9). The lock mechanism 704 (lock actuator 704) may comprise, for example but without limitation, a linear hydraulic actuator, a ball screw actuator, an electric actuator, or other actuation mechanism.

A navigation light 706 may be located near a separation section between the stationary part 610 of the wing 302 and the rotating wing tip 306, and is configured to be exposed and activated upon rotation of the rotating wing tip 306.

Figure 7A:
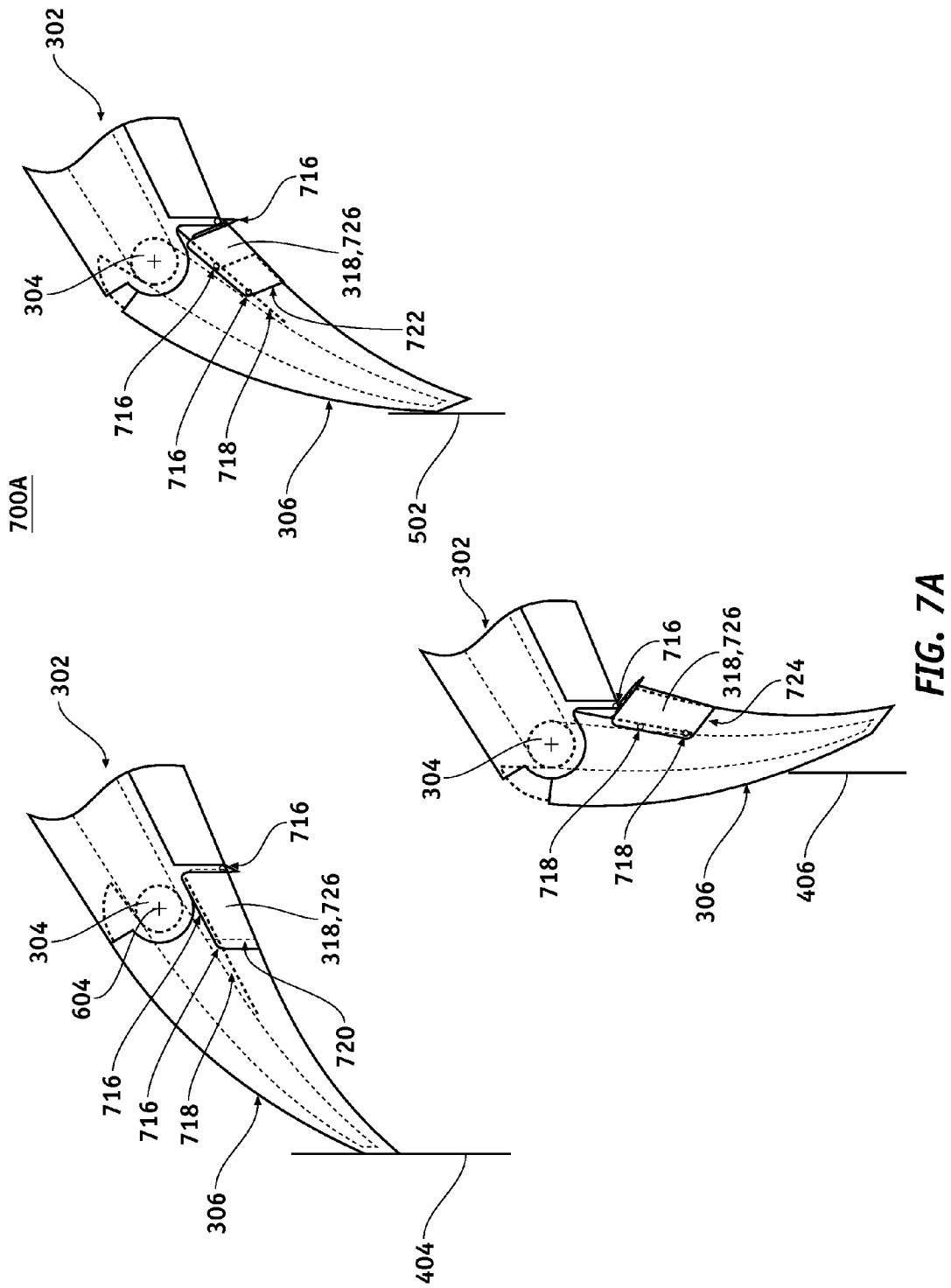
FIG. 7A is an illustration of an exemplary perspective view of a swing tip assembly system showing a rotation joint and a moving panel of a rotating wing in a sliding configuration according to an embodiment of the disclosure.

FIG. 7A is an illustration of an exemplary perspective view of a swing tip assembly system 700A (system 700A) showing a rotation joint 304 and the moving panel 318 in a sliding configuration 726 according to an embodiment of the disclosure. System 700A may have functions, material, and structures that are similar to the system 700. Therefore common features, functions, and elements may not be redundantly described here.

When the rotating wing tip 306 is not rotated such as in the high speed extended configuration 404, the moving panel 318 is at a closed position 720.

Before the rotating wing tip 306 is rotated, the moving panel 318 in the sliding configuration 726 slides on a roller 716 supported by tacks 718 to a slided position 722 in a low speed rotated swept back configuration 502, or in a slided position 724 in a rotated stowed position 406 during taxi or gate parking maneuvers.

Figure 8:
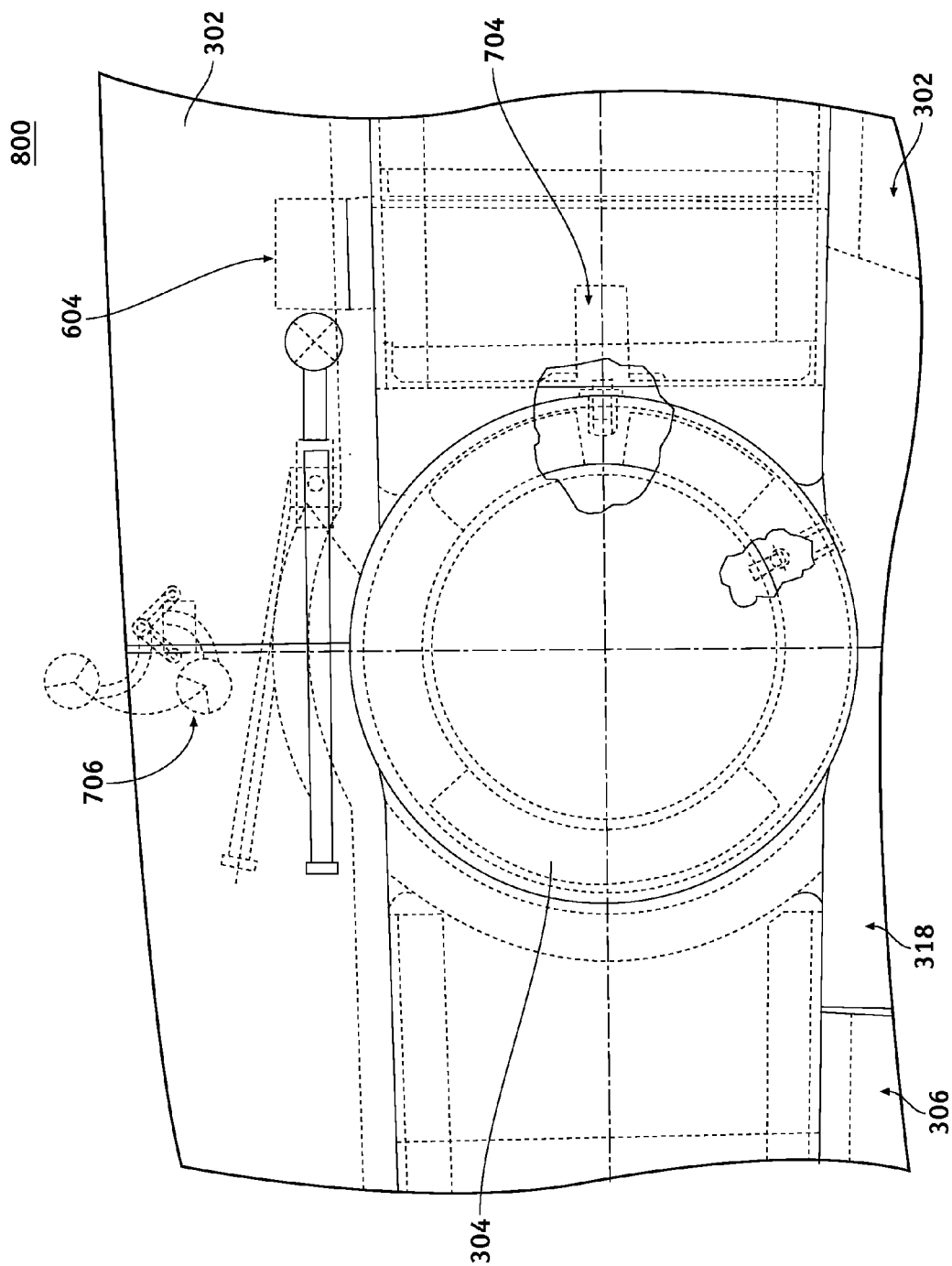
FIG. 8 is an illustration of an expanded top view of a portion of the swing tip assembly system of FIG. 7.

FIG. 8 is an illustration of an expanded top view 800 of a portion of the swing tip assembly system 700 of FIG. 7.

FIG. 9 is an illustration of a cross sectional view 900 of the swing tip assembly system 700 of FIG. 7 taken along a line A-A 708. The rotation joint 304 comprises mating cylindrical surfaces 920, 940 and 960 (316 in FIG. 3), and is coupled to the rotating wing tip 306. The rotation joint 304 rotates the rotating wing tip 306 in the plane 504 (FIG. 5) of the wing 302.

The mating cylindrical surfaces 920, 940 and 960 comprise an upper fixed joint plate 920, an inner mid rotation joint plate 940, and a lower fixed joint plate 960. The inner mid rotation joint plate 940 is coupled to the rotating wing tip 306 and is configured to rotate the rotating wing tip 306 in the plane 504 of the wing 302 in response to an actuation command. The upper fixed joint plate 920 is clamped to the inner mid rotation joint plate 940 and is coupled to the wing 302 and secures the inner mid rotation joint plate 940 in place. The lower fixed joint plate 960 is also clamped to the inner mid rotation joint plate 940 and is coupled to wing 302 and secures the inner mid rotation joint plate 940 in place.

Figure 10:
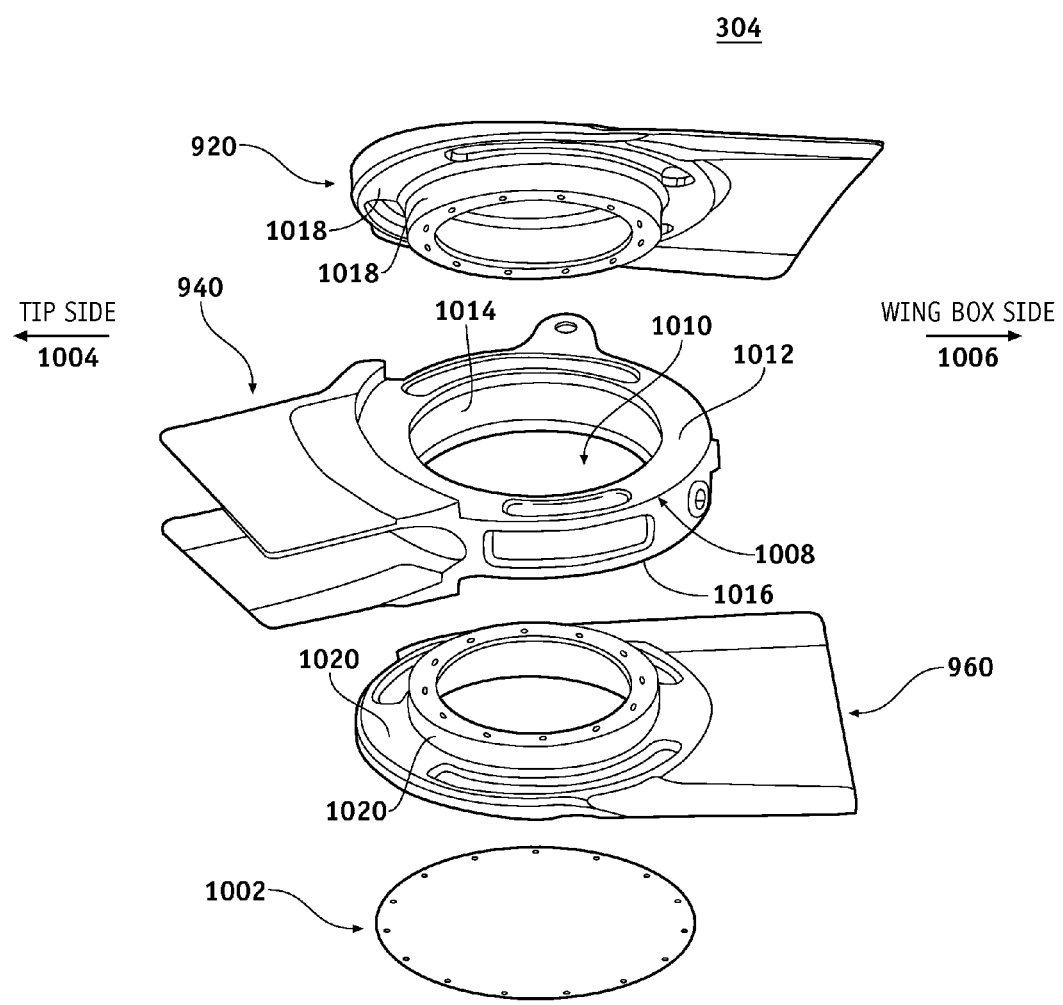
FIG. 10 is an illustration of an exemplary perspective view of mating cylindrical surfaces of a rotation joint of a swing tip assembly according to an embodiment of the disclosure.

FIG. 10 is an illustration of an exemplary perspective view of mating cylindrical surfaces 920/940/960 of the rotation joint 304 of the swing tip assembly 306 according to an embodiment of the disclosure. The mating cylindrical surfaces 920/940/960 comprise the upper fixed joint plate 920 (upper joint plate 920), the inner mid rotation joint plate 940 (rotation plate 940), and the lower fixed joint plate 960 (lower joint plate 960). The rotation plate 940 is coupled to the swing tip assembly 306 at the swing tip assembly side 1004 (tip side) and to the fluid-dynamic body 302 at the fluid-dynamic body side 1006 (wing box side). A lower access cover plate 1002 is coupled to the lower joint plate 960 to allow access to the rotation joint 304.

The rotation plate 940 couples to the swing tip assembly 306, and comprises a slide ring 1008 comprising an open center 1010, an upper slide surface 1012, an inner slide surface 1014, and a lower slide surface 1016.

The upper joint plate 920 is slidably coupled to the upper slide surface 1012 and the inner slide surface 1014, and couples to the fluid-dynamic body 302.

The lower joint plate 960 is slidably coupled to the lower slide surface 1016 and the inner slide surface 1014, and is coupled to the upper joint plate 920 through the open center 1010, and couples to the fluid-dynamic body 302.

The rotation joint 304 is configured to rotationally couple the swing tip assembly 306 to the fluid-dynamic body 302.

In operation, a position of the swing tip assembly 306 is configured in the plane 504 (FIG. 5) of the fluid-dynamic body 302 by rotation of the rotation plate 940 relative to the upper joint plate 920 and the lower joint plate 960. In this manner, the upper slide surface 1012 of the slide ring 1008 of the rotation plate 940 slides on an upper slidable coupling 1018 to the upper joint plate 920 coupled to the fluid-dynamic body 302. The lower slide surface 1016 of the slide ring 1008 slides on a lower slidable coupling 1020 to the lower joint plate 960 coupled to the fluid-dynamic body 302. The inner slide surface 1014 of the slide ring 1008 slides on the upper slidable coupling 1018 to the upper joint plate 920 and on the lower slidable coupling 1020 to the lower joint plate 960.

Figure 11:
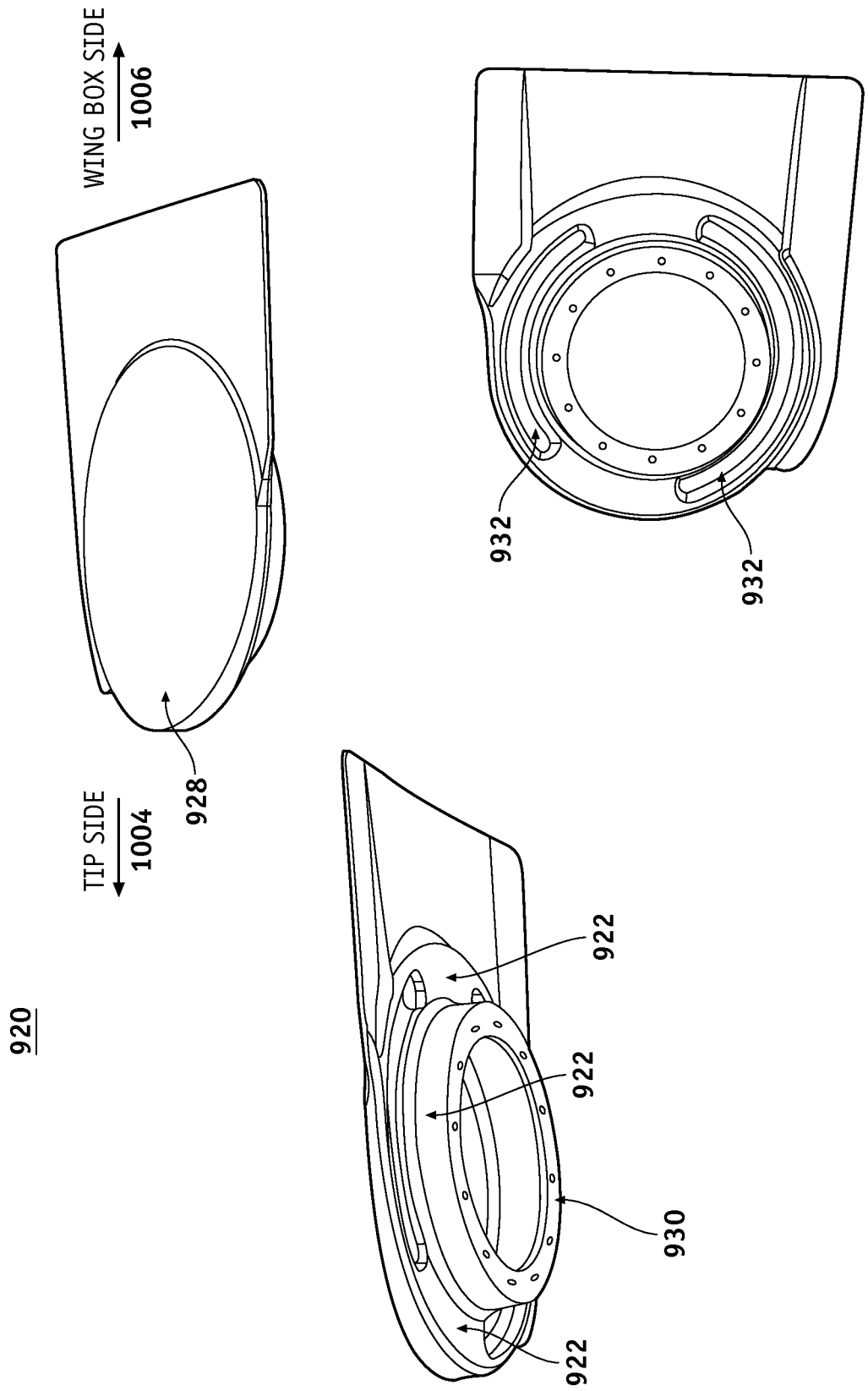
FIG. 11 is an illustration of exemplary perspective views of an upper fixed joint plate of the rotation joint of FIG. 10.

FIG. 11 is an illustration of exemplary perspective views of the upper joint plate 920 of the rotation joint 304 of FIG. 10. The upper joint plate 920 comprises a contoured upper face 928, a mating face 930 for coupling to the lower joint plate 960, low friction wear faces 922, and lightening pockets 932. The lightening pockets 932 are placed on the upper joint plate 920 where the upper joint plate 920 mates with the lower joint plate 960. The low friction wear faces 922 are placed between the rotation plate 940, the upper joint plate 920, and the lower joint plate 960. The low friction wear faces 922 may comprise, for example but without limitation, Karon lining, or other low friction wear strip material.

Figure 12:
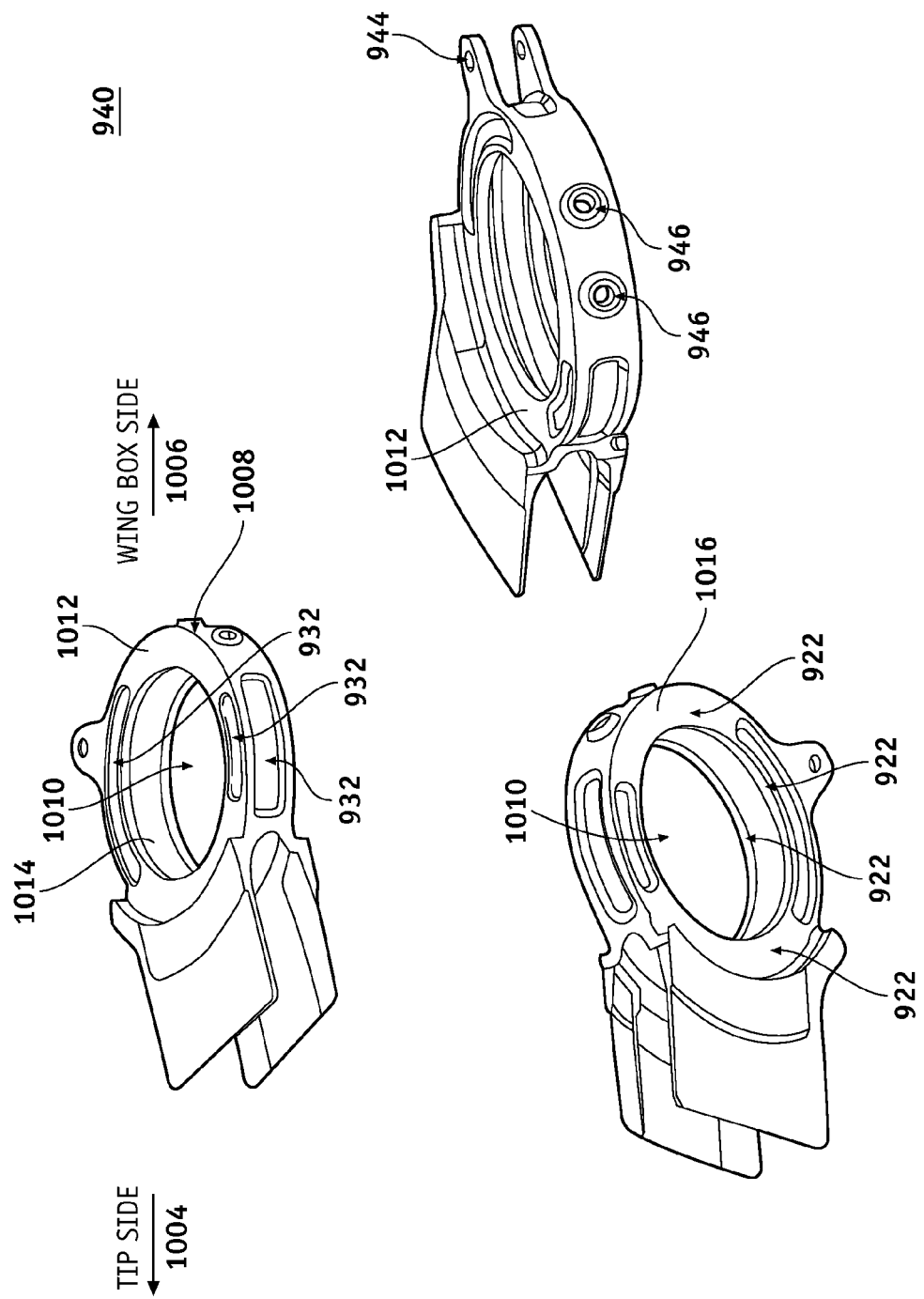
FIG. 12 is an illustration of exemplary perspective views of an inner mid rotation joint plate of the rotation joint of FIG. 10.

FIG. 12 is an illustration of exemplary perspective views of the rotation plate 940 of the rotation joint 304 of FIG. 10. The rotation plate 940 comprises the lightening pockets 932, actuation mount lug 944, locking pin locations 946, and the low friction wear faces 922.

Figure 13:
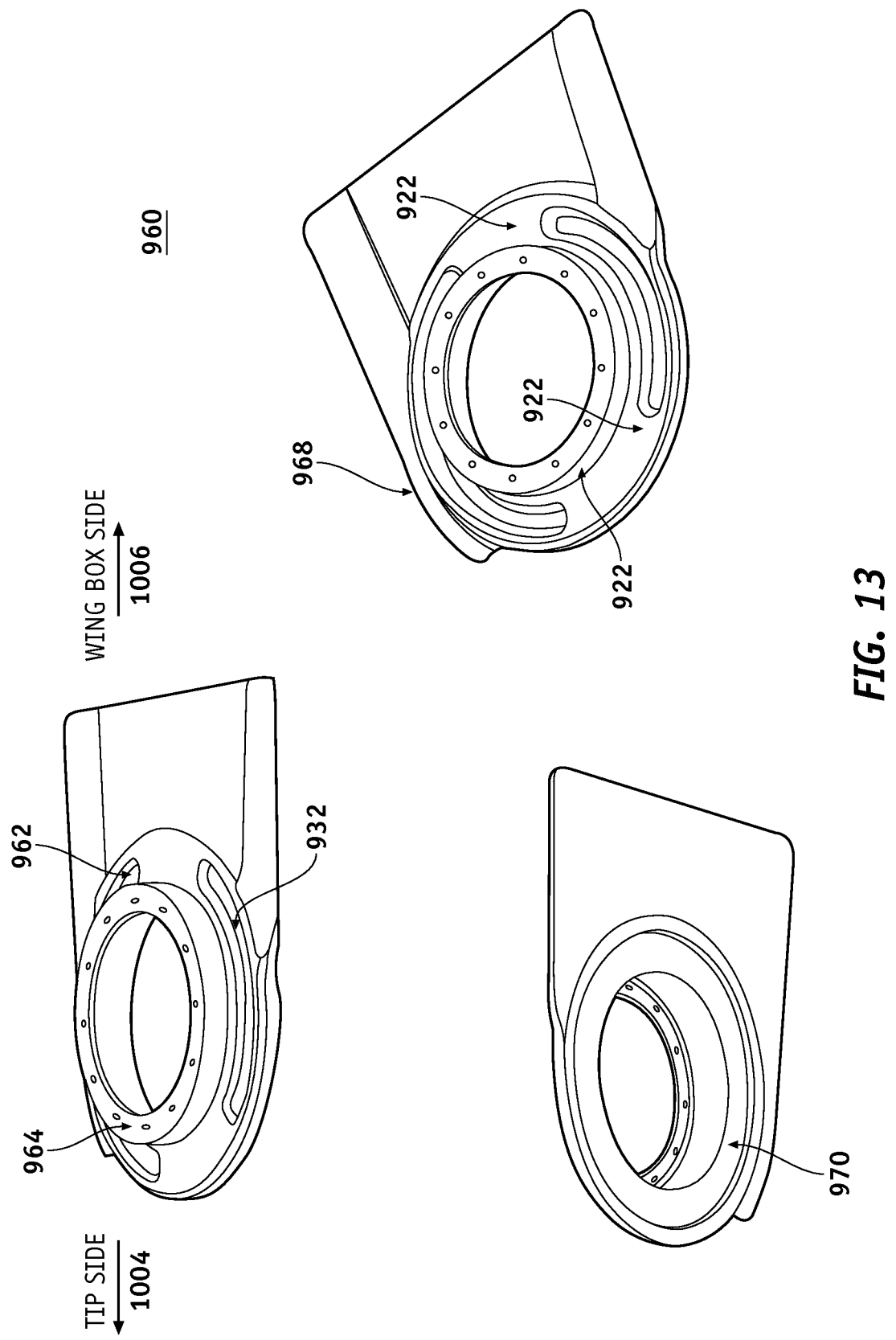
FIG. 13 is an illustration of exemplary perspective views of a lower fixed joint plate of the rotation joint of FIG. 10.

FIG. 13 is an illustration of exemplary perspective views of the lower joint plate 960 of the mating cylindrical surfaces 316 of the rotation joint 304 of FIG. 10. The lower fixed joint plate 960 comprises, the lightening pockets 932, a mating face 964 for coupling to the upper joint plate 920, the low friction wear faces 922, a leading edge support tab 968, and a lower closure panel rebate 970.

Figure 14:
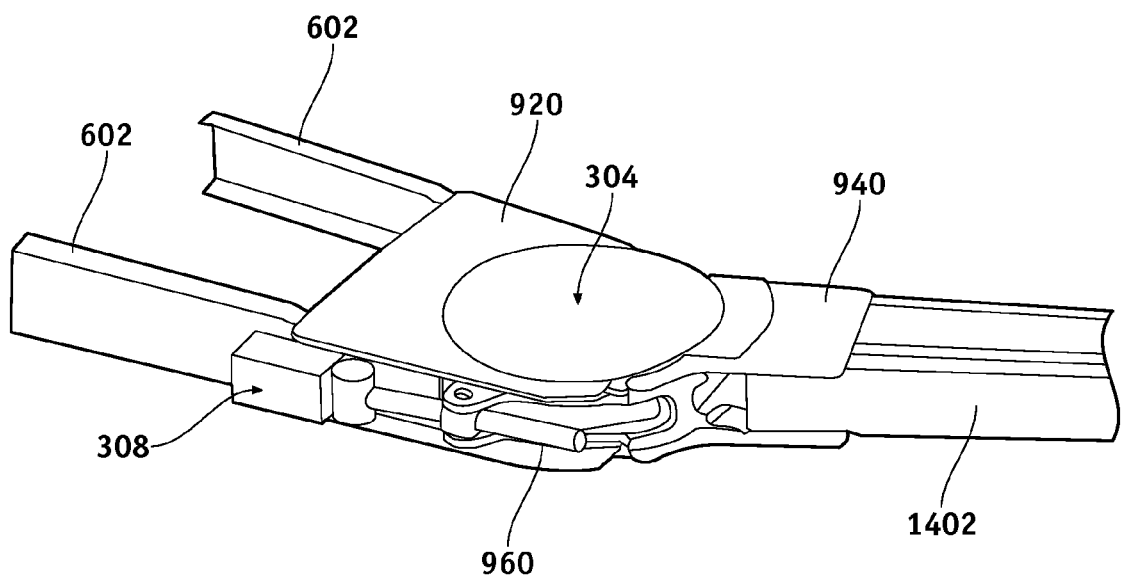
FIG. 14 is an illustration of an exemplary perspective view of a swing tip assembly system according to an embodiment of the disclosure.

FIG. 14 is an illustration of an exemplary perspective view of a swing tip assembly system 1400 (system 1400) according to an embodiment of the disclosure. The system 1400 comprises the rotation joint 304 coupled to the fluid-dynamic body 302 by a structure such as the wing spar 602, and coupled to the swing tip assembly 306 by a structure such as a wing tip spar 1402. The rotation joint 304 comprises the upper joint plate 920, the rotation plate 940, and the lower joint plate 960 as the mating cylindrical surfaces 316 and a lower access cover plate 1002 coupled to the lower joint plate 960 as explained above.

The swing tip assembly 306 can be rotated from an extended position such as the high speed extended configuration 404 (FIG. 4) to a deployed position by the rotation plate 940 in response to an actuation of the actuator 308 as explained above. For example but without limitation, the deployed position may comprise, the low speed rotated swept back configuration 502, the rotated stowed configuration 406, or other deployed position suitable for operation of the system 1400.

Figure 15:
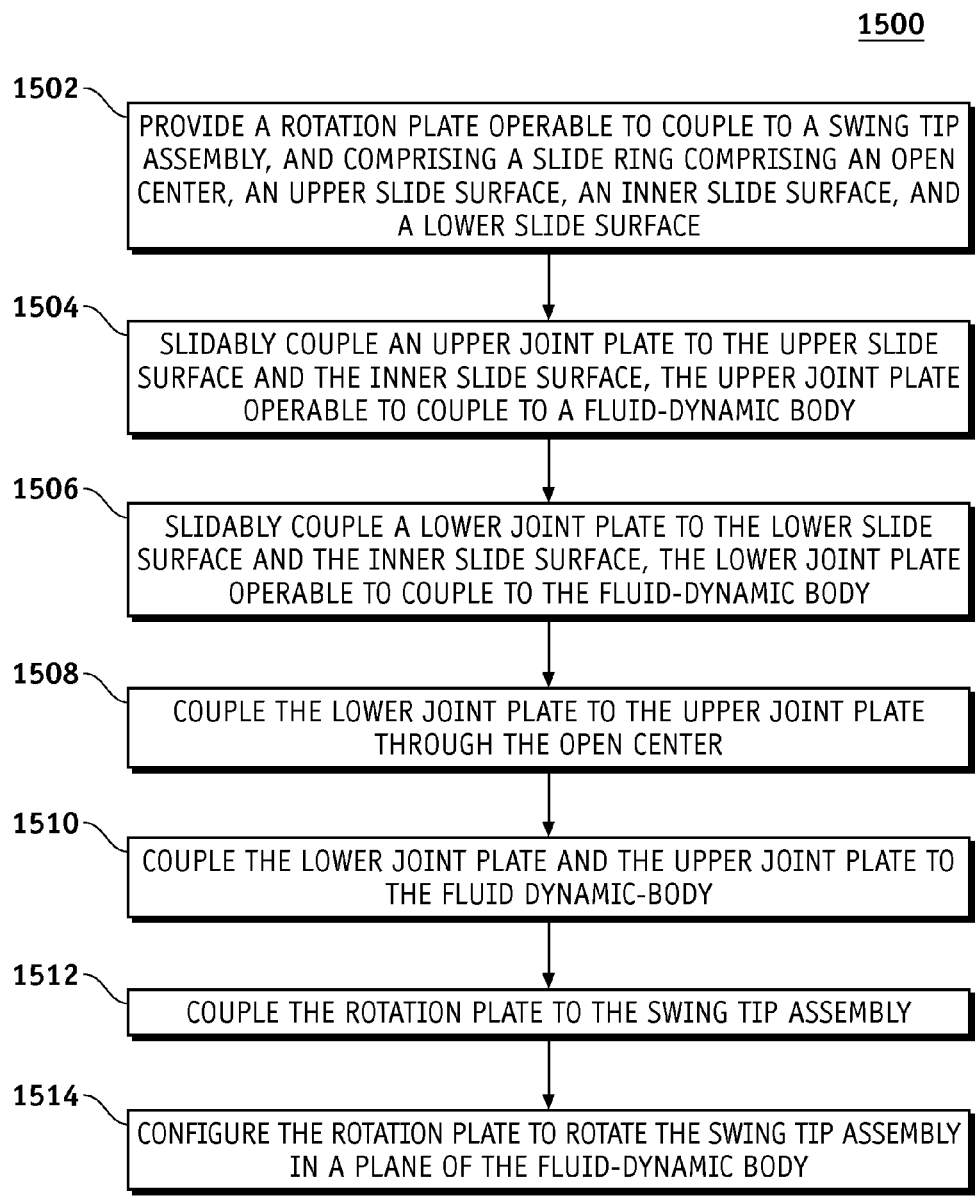
FIG. 15 is an illustration of an exemplary flowchart showing a process for providing rotation of a swing tip assembly coupled to a fluid-dynamic body according to an embodiment of the disclosure.

FIG. 15 is an illustration of an exemplary flowchart showing a process 1500 for providing rotation of the swing tip assembly 306 coupled to the fluid-dynamic body 302 according to an embodiment of the disclosure. The various tasks performed in connection with process 1500 may be performed mechanically, by software, hardware, firmware, computer-readable software, computer readable storage medium, or any combination thereof. It should be appreciated that process 1500 may include any number of additional or alternative tasks, the tasks shown in FIG. 15 need not be performed in the illustrated order, and the process 1500 may be incorporated into a more comprehensive procedure or process having additional functionality not described in detail herein.

For illustrative purposes, the following description of process 1500 may refer to elements mentioned above in connection with FIGS. 1-14. In practical embodiments, portions of the process 1500 may be performed by different elements of the system 300 such as: the fluid-dynamic body 302, the rotation joint 304, the swing tip assembly 306, the actuator 308, the controller 310, the moving panel 318, the lock actuator 704, etc. It should be appreciated that process 1500 may include any number of additional or alternative tasks, the tasks shown in FIG. 15 need not be performed in the illustrated order, and the process 1500 may be incorporated into a more comprehensive procedure or process having additional functionality not described in detail herein.

Process 1500 may begin by providing a rotation plate such as a rotation plate 940 operable to couple to a swing tip assembly such as the swing tip assembly 306, and comprising a slide ring such as the slide ring 1008 comprising an open center such as the open center 1010, an upper slide surface such as the upper slide surface 1012, an inner slide surface such as the inner slide surface 1014, and a lower slide surface such as the lower slide surface 1016 (task 1502).

Process 1500 may continue by slidably coupling an upper joint plate such as the upper joint plate 920 to the upper slide surface 1012 and the inner slide surface 1014, the upper joint plate 920 operable to couple to a fluid-dynamic body such as the fluid-dynamic body 302 (task 1504).

Process 1500 may continue by slidably coupling a lower joint plate such as the lower joint plate 960 to the lower slide surface 1016 and the inner slide surface 1014, the lower joint plate 960 operable to couple to the fluid-dynamic body 302 (task 1506).

Process 1500 may continue by coupling the lower joint plate 960 to the upper joint plate 920 through the open center 1010 (task 1508).

Process 1500 may continue by coupling the lower joint plate 960 and the upper joint plate 920 to the fluid-dynamic-body 302 (task 1510).

Process 1500 may continue by coupling the rotation plate 940 to the swing tip assembly 306 (task 1512).

Process 1500 may continue by configuring the rotation plate 940 to rotate the swing tip assembly 306 in a plane such as the plane 504 of the fluid-dynamic body 302 (task 1514).

Figure 16:
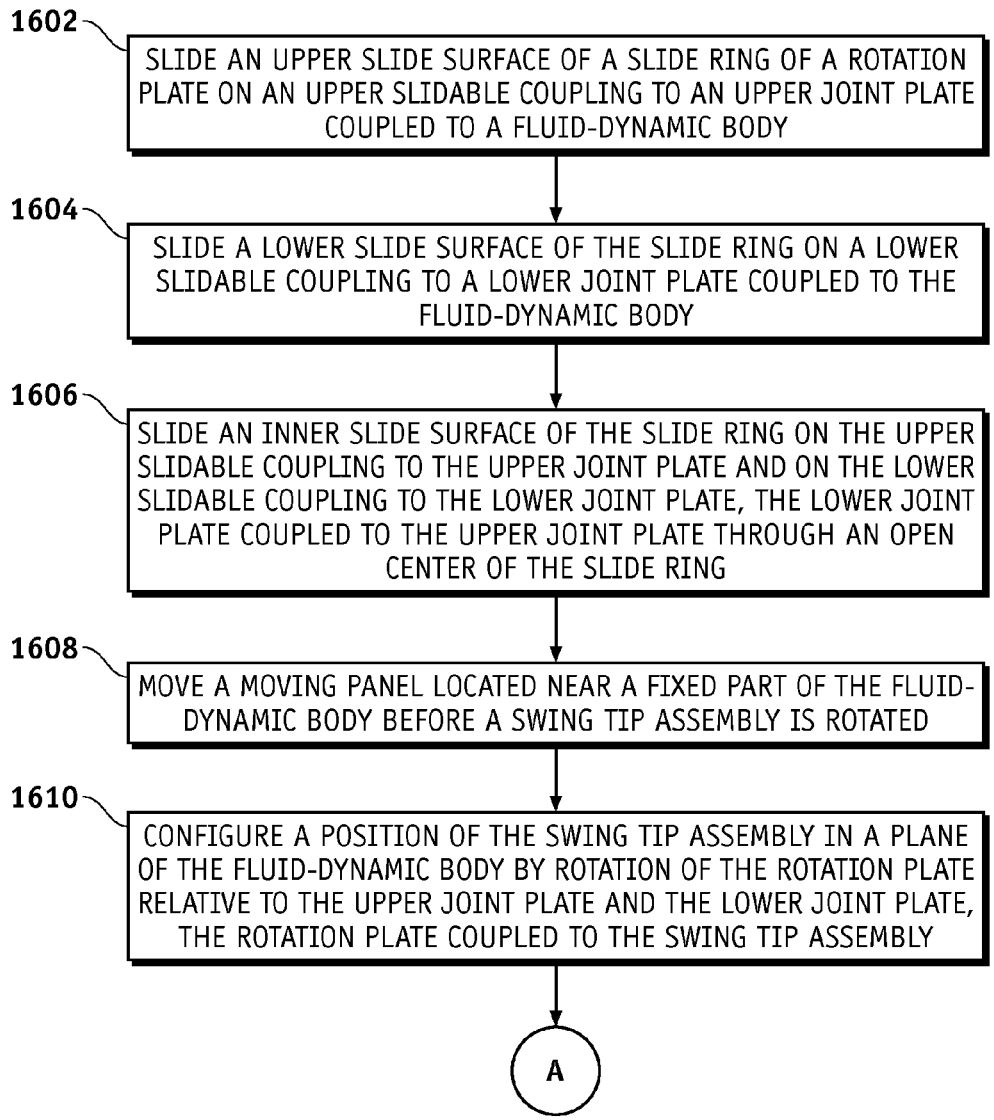
FIG. 16 is an illustration of an exemplary flowchart showing a process for operating a rotation joint for a swing tip assembly coupled to a fluid-dynamic body, according to an embodiment of the disclosure.
Figure 16:
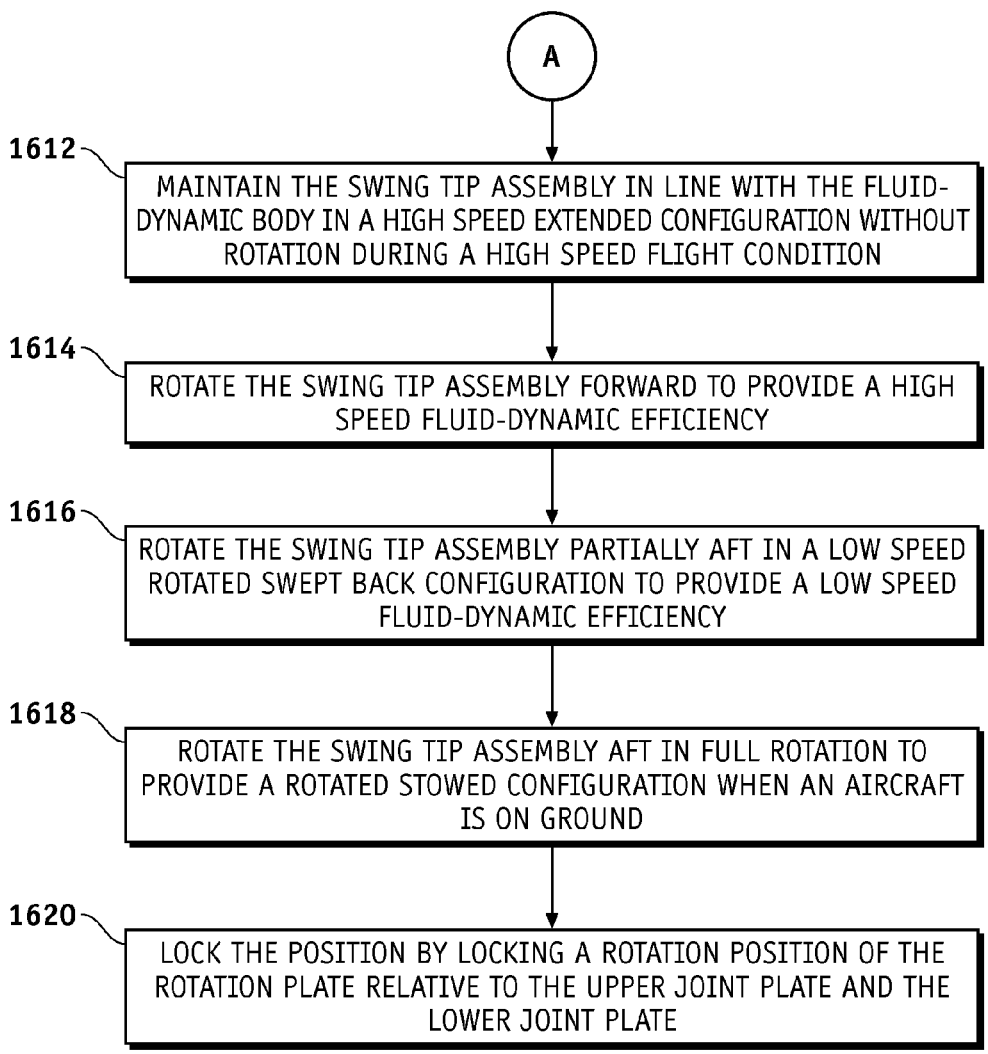

FIG. 16 is an illustration of an exemplary flowchart showing a process 1600 for operating the rotation joint 304 for the swing tip assembly 306 coupled to the fluid-dynamic body 302, according to an embodiment of the disclosure. The various tasks performed in connection with process 1600 may be performed mechanically, by software, hardware, firmware, computer-readable software, computer readable storage medium, or any combination thereof. It should be appreciated that process 1600 may include any number of additional or alternative tasks, the tasks shown in FIG. 16 need not be performed in the illustrated order, and the process 1600 may be incorporated into a more comprehensive procedure or process having additional functionality not described in detail herein.

For illustrative purposes, the following description of process 1600 may refer to elements mentioned above in connection with FIGS. 1-14. In practical embodiments, portions of the process 1600 may be performed by different elements of the system 300 such as: the fluid-dynamic body 302, the rotation joint 304, the swing tip assembly 306, the actuator 308, the controller 310, the moving panel 318, the lock actuator 704, etc. It should be appreciated that process 1600 may include any number of additional or alternative tasks, the tasks shown in FIG. 16 need not be performed in the illustrated order, and the process 1600 may be incorporated into a more comprehensive procedure or process having additional functionality not described in detail herein.

Process 1600 may begin by sliding an upper slide surface such as the upper slide surface 1012 of a slide ring such as the slide ring 1008 of a rotation plate such as the rotation plate 940 on an upper slidable coupling such as the upper slidable coupling 1018 to an upper joint plate such as the upper joint plate 920 coupled to the fluid-dynamic body 302 (task 1602).

Process 1600 may continue by sliding a lower slide surface such as the lower slide surface 1016 of the slide ring 1008 on a lower slidable coupling such as the lower slidable coupling 1020 to a lower joint plate such as the lower joint plate 960 coupled to the fluid-dynamic body 302 (task 1604).

Process 1600 may continue by sliding an inner slide surface such as the inner slide surface 1014 of the slide ring 1008 on the upper slidable coupling 1018 to the upper joint plate 920 and on the lower slidable coupling 1020 to the lower joint plate 960, the lower joint plate 960 coupled to the upper joint plate 920 through an open center such as the open center 1010 of the slide ring 1008 (task 1606).

Process 1600 may continue by moving a moving panel such as the moving panel 318 located near a fixed part such as the fixed part 610 of the fluid-dynamic body 302 before the swing tip assembly 306 is rotated (task 1608). The moving panel 318 may comprise a folding panel configured to fold in the folding configuration 612, a sliding panel configured to slide in the sliding configuration 726, or other movable surface configuration configured to move.

Process 1600 may continue by configuring a position of the swing tip assembly 306 in a plane such as the plane 504 of the fluid-dynamic body 302 by rotation of the rotation plate 940 relative to the upper joint plate 920 and the lower joint plate 960, the rotation plate 940 coupled to the swing tip assembly 306 (task 1610).

Process 1600 may continue by maintaining the swing tip assembly 306 in line with the fluid-dynamic body 302 in a high speed extended configuration such as the high speed extended configuration 404 without rotation during a high speed flight condition (task 1612).

Process 1600 may continue by rotating the swing tip assembly 306 forward to provide a high speed fluid-dynamic efficiency (task 1614).

Process 1600 may continue by rotating the swing tip assembly 306 partially aft in a low speed rotated swept back configuration such as the low speed rotated swept back configuration 502 to provide a low speed fluid-dynamic efficiency (task 1616).

Process 1600 may continue by rotating the swing tip assembly 306 aft in full rotation to provide a rotated stowed configuration such as the rotated stowed configuration 406 when an aircraft such as the aircraft 200 is on ground (task 1618).

Process 1600 may continue by locking the position (of the swing tip assembly 306) by locking a rotation position of the rotation plate 940 relative to the upper joint plate 920 and the lower joint plate 960 (task 1620).

Figure 17:
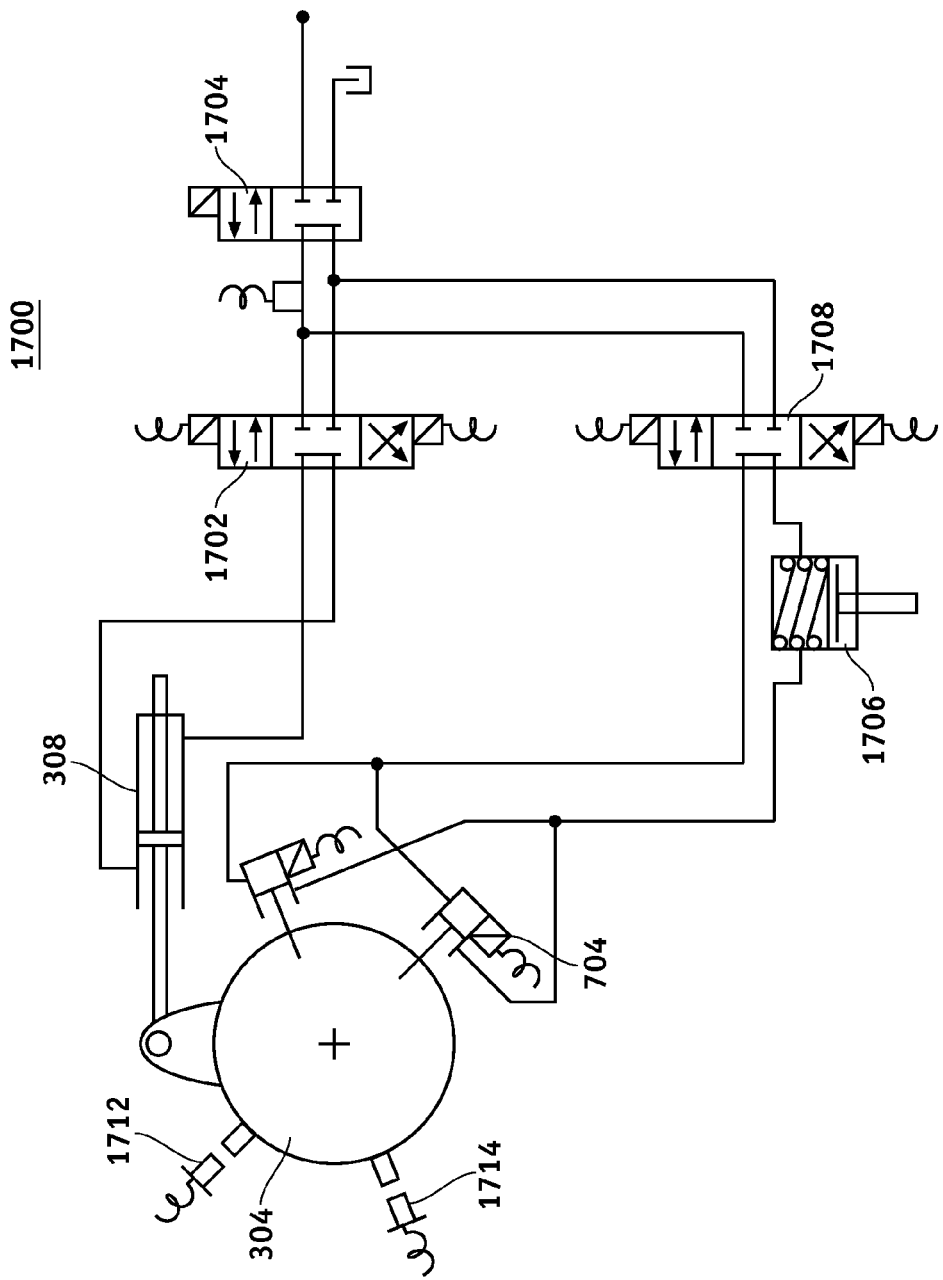
FIG. 17 is an illustration of an exemplary actuation mechanism of a swing tip assembly system according to an embodiment of the disclosure.

FIG. 17 is an illustration of an exemplary actuation mechanism 1700 of a swing tip assembly system 300 according to an embodiment of the disclosure. The actuation mechanism 1700 comprises the rotation joint 304, the swing tip actuator 308, the lock actuator 704, a swing selector valve 1702, a motor operation isolation valve 1704, a manual release 1706, a latch selector valve 1708, a swing sensor 1712, and a moving plate sensor 1714.

In operation, the actuation mechanism 1700 can be controlled by the controller 310 to rotate the swing tip assembly 306. An actuation command from the actuator 308 is sent to the rotation joint 304, thereby swinging/rotating the swing tip assembly 306 in response to the actuation command. The lock actuator 704 locks the rotation plate 940 in a rotation position relative to the upper joint plate 920 and the lower joint plate 960 when actuated. The manual release 1706 is configured to manually unlock the lock actuator 704 (latches) that lock the rotation plate 940, followed by driving fluid into a retract side of the lock actuator 704 (latches) with, e.g., a hand pump (not shown). When the lock actuator 704 (latches) are retracted, the swing tip assembly 306 may be moved, e.g., by hand.

In this way, embodiments of the discloser provide a rotating joint that allows the wing tip to rotate aft in order to facilitate a reduced wing span during taxi and gate parking. In addition, the wing tip can be rotated forward for high speed aerodynamic benefit, rotated part way aft for low speed aerodynamic benefit, and rotated further aft for taxi and gate parking. Thus, embodiments provide an ability to change the aircraft wing span allowing the aircraft be more efficient in flight with larger wing span yet still be accommodated within existing airport restrictions.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-8 depict example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, storage unit, or other non-transitory media. These and other forms of computer-readable media may be involved in storing one or more instructions for use by the processor module 312 to cause the processor module 312 to perform specified operations. Such instructions, generally referred to as "computer program code" or "program code" (which may be grouped in the form of computer programs or other groupings), when executed, enable the system 300.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A rotation joint for rotationally coupling a swing tip assembly to a fluid-dynamic body, the rotation joint comprising:
   a rotation plate operable to couple to a swing tip assembly, and comprising a slide ring comprising an open center, an upper slide surface, an inner slide surface, and a lower slide surface;
   an upper joint plate slidably coupled to the upper slide surface and the inner slide surface, and operable to couple to a fluid-dynamic body; and
   a lower joint plate slidably coupled to the lower slide surface and the inner slide surface, and operable to couple to the fluid-dynamic body, and coupled to the upper joint plate through the open center.

2. The rotation joint of claim 1, further comprising a lower access cover plate coupled to the lower joint plate and operable to allow access to the open center.

3. The rotation joint of claim 1, further comprising a swing tip actuator coupled to the rotation joint and the fluid-dynamic body, and operable to rotate the swing tip assembly in a plane of the fluid-dynamic body in response to an actuation.

4. The rotation joint of claim 3, wherein the swing tip actuator comprises one of: a linear hydraulic actuator, and a ball screw actuator.

5. The rotation joint of claim 1, further comprising a lock mechanism operable to lock the rotation plate in a rotation position relative to the upper joint plate and the lower joint plate when actuated.

6. The rotation joint of claim 1, wherein:
   a plurality of lightening pockets are placed on the upper joint plate where the upper joint plate mates with the lower joint plate, and
   a low friction wear strip material is placed between the rotation joint and the upper joint plate and the rotation joint and the lower joint plate.

7. The rotation joint of claim 1, further comprising:
   the fluid dynamic-body comprising a wing of an aircraft; and
   the swing tip assembly comprising a wing tip.

8. The rotation joint of claim 7, further comprising a navigation light located near a separation section between the fluid-dynamic body and the swing tip assembly and operable to be exposed and activated in response to rotation of the swing tip assembly.

9. The rotation joint of claim 7, wherein the swing tip assembly further comprises a moving panel located near a fixed part of the fluid-dynamic body and operable to move before the swing tip assembly is rotated.

10. A method for providing rotation of a swing tip assembly coupled to a fluid-dynamic body, the method comprising:
    providing a rotation plate operable to couple to a swing tip assembly, and comprising a slide ring comprising an open center, an upper slide surface, an inner slide surface, and a lower slide surface;
    slidably coupling an upper joint plate to the upper slide surface and the inner slide surface, the upper joint plate operable to couple to a fluid-dynamic body;
    slidably coupling a lower joint plate to the lower slide surface and the inner slide surface, the lower joint plate operable to couple to the fluid-dynamic body; and
    coupling the lower joint plate to the upper joint plate through the open center.

11. The method of claim 10, further comprising:
    coupling the lower joint plate and the upper joint plate to the fluid dynamic-body; and
    coupling the rotation plate to the swing tip assembly.

12. The method of claim 11, further comprising configuring the rotation plate to rotate the swing tip assembly in a plane of the fluid-dynamic body.

13. The method of claim 11, wherein:
    the fluid-dynamic body comprises a wing of an aircraft; and
    the swing tip assembly comprises a wing tip.

14. A method for operating a rotation joint for a swing tip assembly coupled to a fluid-dynamic body, the method comprising:

sliding an upper slide surface of a slide ring of a rotation plate on an upper slidable coupling to an upper joint plate coupled to the fluid-dynamic body;

sliding a lower slide surface of the slide ring on a lower slidable coupling to a lower joint plate coupled to the fluid-dynamic body;

sliding an inner slide surface of the slide ring on the upper slidable coupling to the upper joint plate and on the lower slidable coupling to the lower joint plate, the lower joint plate coupled to the upper joint plate through an open center of the slide ring; and configuring a position of the swing tip assembly in a plane of the fluid-dynamic body by rotation of the rotation plate relative to the upper joint plate and the lower joint plate, the rotation plate coupled to the swing tip assembly.

15. The method of claim 14, further comprising moving a moving panel located near a fixed part of the fluid-dynamic body before the swing tip assembly is rotated.

16. The method of claim 14, further comprising maintaining the swing tip assembly in line with the fluid-dynamic body in a high speed extended configuration without rotation during a high speed flight condition.

17. The method of claim 14, further comprising rotating the swing tip assembly forward to provide a high speed fluid-dynamic efficiency.

18. The method of claim 14, further comprising rotating the swing tip assembly partially aft in a low speed rotated swept back configuration to provide a low speed fluid-dynamic efficiency.

19. The method of claim 14, further comprising rotating the swing tip assembly aft in full rotation to provide a rotated stowed position when an aircraft is on ground.

20. The method of claim 14, further comprising locking the position by locking a rotation position of the rotation plate relative to the upper joint plate and the lower joint plate.

* * * * *